US007355626B2

(12) United States Patent
Porter et al.

(10) Patent No.: US 7,355,626 B2
(45) Date of Patent: Apr. 8, 2008

(54) LOCATION OF EVENTS IN A THREE DIMENSIONAL SPACE UNDER SURVEILLANCE

(75) Inventors: Stephen George Porter, Towcester (GB); John Lindsay Galloway, Towcester (GB)

(73) Assignee: Infrared Integrated Systems Limited, Towcester (GB)

( * ) Notice: Subject to any disclaimer, the term of this patent is extended or adjusted under 35 U.S.C. 154(b) by 776 days.

(21) Appl. No.: 10/134,176

(22) Filed: Apr. 29, 2002

(65) Prior Publication Data

US 2002/0175996 A1 Nov. 28, 2002

(30) Foreign Application Priority Data

Apr. 30, 2001 (GB) ................................ 0110535.2

(51) Int. Cl.
*H04N 7/18* (2006.01)

(52) U.S. Cl. ...................................................... 348/143

(58) Field of Classification Search ................ 348/143, 348/164, 152, 155, 169, 153, 211, 159, 144, 348/145, 146, 147, 148, 150, 151, 160, 170; 382/242, 243, 103, 107, 219, 146; 340/567, 340/511, 522, 533

See application file for complete search history.

(56) References Cited

U.S. PATENT DOCUMENTS 3,829,693 A * 8/1974 Schwarz ..................... 250/338
4,246,480 A * 1/1981 Clark ......................... 250/349
4,746,910 A * 5/1988 Pfister et al. ............... 340/567
5,579,471 A * 11/1996 Barber et al. ............... 395/326
5,641,963 A * 6/1997 Mueller ...................... 250/342
5,689,442 A * 11/1997 Swanson et al. ............ 380/241
5,870,022 A * 2/1999 Kuhnly et al. .............. 340/567
5,980,123 A * 11/1999 Heifler ....................... 396/427
5,986,265 A 11/1999 Kim et al. ............... 250/338.3
6,476,859 B1 * 11/2002 Galloway et al. ........... 348/164
6,710,345 B2 * 3/2004 Carter et al. ............. 250/338.5
6,816,186 B2 * 11/2004 Luke et al. ................. 348/159
6,829,371 B1 * 12/2004 Nichani et al. ............. 382/103

FOREIGN PATENT DOCUMENTS

EP 0 098 235 1/1984

(Continued)

OTHER PUBLICATIONS

U.S. Appl. No. 09/558,279, filed Apr. 25, 2000, Hollock et al.

(Continued)

*Primary Examiner*—Anand Rao
*Assistant Examiner*—Behrooz Senfi
(74) *Attorney, Agent, or Firm*—Patterson & Sheridan, LLP

(57) ABSTRACT

A surveillance system using an array of detectors onto which energy from the scene under surveillance is focused can indicate the direction of an event that has been recognized. The invention uses two or more arrays to locate events in three dimensions, and to define regions within the three dimensional space being surveyed. The events are located by detecting which elements from the respective arrays are stimulated by the occurrence of an event, and determining the location of the event to be at the intersection of the fields of view of the stimulated elements.

8 Claims, 1 Drawing Sheet

FOREIGN PATENT DOCUMENTS

Figure 1:
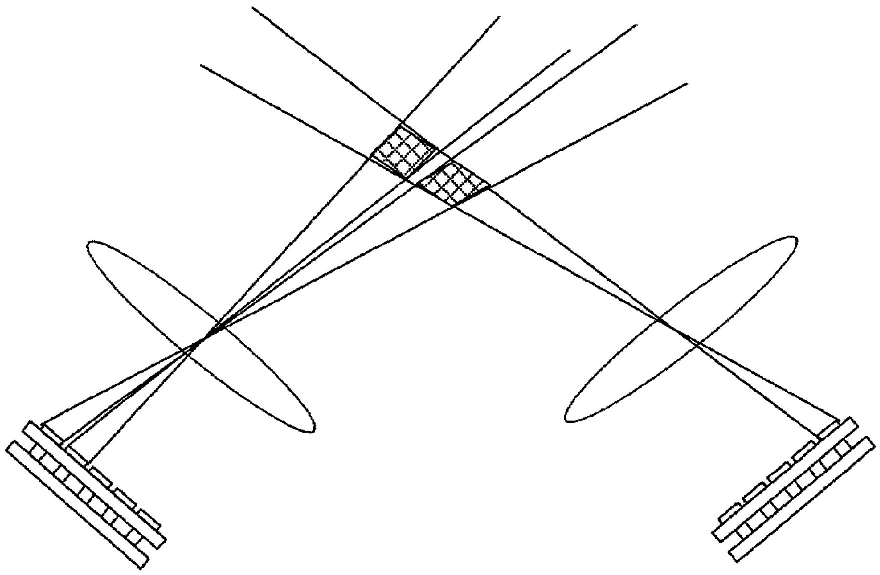

| | | | |
|---|---|---|---|
| EP | 0 402 829 | | 12/1990 |
| EP | 0 547 635 | | 6/1993 |
| EP | 0 633 554 | A1 | 1/1995 |
| EP | 0 853 237 | | 7/1998 |
| EP | 1 024 465 | A1 | 8/2000 |
| GB | 2 313 971 | | 12/1997 |

OTHER PUBLICATIONS

U.S. Appl. No. 09/579,636, filed May 26, 2000, Galloway et al.
U.S. Appl. No. 09/643,099, filed Aug. 21, 2000, Galloway.
U.S. Appl. No. 09/805,091, filed Mar. 13, 2001, Galloway.
U.S. Appl. No. 09/826,126, filed Apr. 4, 2001, Carter et al.
U.S. Appl. No. 09/912,242, filed Jul. 23, 2001, Galloway.
U.S. Appl. No. 10/005,883, filed Dec. 3, 2001, Whatmore.
U.S. Appl. No. 10/022,966, filed Dec. 13, 2001, Porter et al.
U.S. Appl. No. 10/028,940, filed Dec. 21, 2001, Porter et al.
U.S. Appl. No. 10/071,589, filed Feb. 8, 2002, Carter.
U.S. Appl. No. 10/094,910, filed Mar. 11, 2002, Porter et al.
U.S. Appl. No. 10/097,482, filed Mar. 14, 2002, Porter et al.
Combined Search & Examination Report from the British Patent Office regarding application serial No. GB 0110535.2, dated Aug. 3, 2001.
European Search Report, Application No. 02253195.8-2215, dated Oct. 15, 2002.

* cited by examiner

LOCATION OF EVENTS IN A THREE DIMENSIONAL SPACE UNDER SURVEILLANCE

BACKGROUND

A surveillance system using an array of detectors onto which the image of a scene under surveillance is focused can locate objects in direction but not absolutely in position, as only the angle at which the energy enters the optical system corresponding to a given array element is defined. Even if the array is of thermal detectors, an attempt to calculate the distance of an object from the array by absolutely measuring the quantity of radiation falling on an element is subject to major uncertainties such as the size, temperature and emissivity of the object detected. A particular case where the absolute position of the object would be of value is in unattended surveillance systems using arrays of pyroelectric elements utilising unchopped infrared radiation, where information about the location and path of an intruder can be used to facilitate his arrest.

SUMMARY OF THE PRESENT INVENTION

The present invention provides a surveillance system arranged to detect events in a scene comprising a predetermined volume in space, the surveillance system comprising:

at least two arrays of passive infrared detector elements, optical collection means associated with each array and arranged to view the volume from different locations so that radiation from the volume is focused onto the respective arrays, and means for processing signals from the elements of the arrays to determine information regarding the location of an event occurring within the volume on the basis of signals from each element of a set of elements, the set comprising at least one element from each of at least two arrays.

It will be appreciated that each set of elements preferably defines a finite volume in space, which corresponds to the intersection of the fields of view of the respective elements of the set, and that three-dimensional location information can therefore be obtained using two-dimensional arrays (or two-dimensional information using linear arrays). This is in contrast with the use of a single array, in which the field of view of a single element constitutes an unbounded volume in a given direction.

The scene under surveillance is surveyed by two, or possibly more, detector arrays preferably at some distance from one another, each with a lens or other imaging system to focus the radiation from the scene onto it. The radiation from the scene may be focused onto the detector arrays without any imposed modulation.

An array used in the present invention will preferably include at least 9 elements, and typically have at least 64 elements but not more than 4,096 elements.

Typically, the predetermined volume in space in which events are detected may be considered to be the volume comprising the intersection of the total fields of view of the elements from the two arrays, i.e. the volume which is surveyed by both arrays. However, where more than two detector arrays are provided, the volume may be considered to be the intersection of the fields of view of all of the arrays, or alternatively the intersection of the fields of view of only two of the arrays. In the latter case, for example, a third array may be provided to increase the effective resolution of the arrays in only a part of the overall scene surveyed by the first two arrays.

Typically the two detector arrays will be at the same horizontal level, but will survey the same scene from opposite sides or from adjacent or opposing corners of the scene. An advantage of the use of two arrays is that obstacles that prevent information from reaching one array will not generally interfere with the operation of the other. However, if one array is obstructed, the positional information normally associated with the pair of arrays is not available, although some positional information may be obtainable when the location of obstacles is known. The addition of more arrays to the system can ensure spatial discrimination in the presence of obstacles.

The information determined by the processing means preferably includes information regarding the distance of the event from each of the arrays, and the arrays are preferably substantially planar, two-dimensional arrays. Preferably, the optical axes of the optical collection means are inclined with respect to each other, in order to view the volume from different directions. The detector elements are preferably pyroelectric detector elements. Using the present invention, the scene can effectively be divided up into discrete volumes or intersection locations, each of which constitutes an intersection between the fields of view of respective elements from at least two different arrays.

Typically, the processing means will perform a thresholding operation on the signals from the detector elements, such that only the signals above a predetermined threshold are used to determine information regarding the location of events in the scene. For example, in a system having two detector arrays, the radiation from an event occurring in the scene is focused by the optical collection means onto both arrays, and may stimulate a single element from each array. On performing a thresholding operation, the processing means would determine that only the signals from the two stimulated elements are above a predetermined threshold level, and would therefore use only these two signals to determine the required information regarding the location of the event. In the simplest case, the identity of the stimulated element from each array would uniquely identify the volume within the scene in which the event is taking place, this volume being defined by the intersection of the fields of view of the two stimulated detector elements.

The processing means preferably comprise means for storing information relating to individual locations within the volume, each location corresponding to an intersection between the fields of view of a respective set of elements comprising an element from each of at least two arrays, means for identifying an individual location within which the event occurs on the basis of the identity of the corresponding set of elements onto which radiation from the event is focused, and means for outputting the stored information relating to the identified location. For example, if the radiation from an event stimulates one element from each of two arrays, the identity of the pair of stimulated elements would be uniquely associated with a location within the scene corresponding to the intersection between the fields of view of those two elements, as described above. Once this location has been identified in this way, the processing means may therefore output predetermined stored information regarding this particular location. This information may, for example, comprise the name of the area in which the event is occurring, some other way of identifying the location to a further component or a user of the system, or a particular action which is to be taken in response to the occurrence of the event in that location. In other words, the stimulation of a given pair or set of elements may lead directly to an output appropriate to the occurrence of a particular event in a particular location.

Only events that correspond to changes in temperature or emissivity in the scene are detected, and these events may be located in space using the present invention. The invention may be further used to segment the field of view into three-dimensional regions, each of which can produce a different response to activity within the field of view. In this way, the amount of data required to be processed can be reduced, since only certain regions or volumes within the scene may need to be monitored closely.

The information determined may comprise information regarding the location of the event relative to surfaces or volumes within the predetermined volume of the scene, the surfaces or volumes being described by adjacent individual locations within the volume, where each location corresponds to an intersection between the fields of view of a respective set of elements comprising an element from each of at least two arrays. In this way, three-dimensional volumes may be defined, which can be monitored in particular ways using specific criteria which may be different from those used for other volumes within the scene. Even if there are regions within a scene in which it is desired for events to be detected, there may be other regions within the volume under surveillance in which events can be expected to occur and are ignored. For example free access may be permitted to some areas of a factory floor, but denied to other areas because of hazards. Under these conditions events that are found by an analysis of the element pairs stimulated to lie within the permitted areas are ignored, while other events indicate an alarm condition. Similarly, three-dimensional surfaces may be defined within the scene as surfaces bounding particular groups of adjacent intersection volumes. In this way, events may be selectively included or excluded from the information determined by the processing means depending on the location of the events relative to such surfaces or volumes. For example, movement or the presence of people in an area to which free access is allowed can be ignored, whilst any movement in a volume which constitutes a restricted area of the scene may be noted and its location, for example, given as an output.

The output from each array is processed and signals derived from each element of each array may be interpreted as coming from a direction known, at least in principle, from the locations and dimensions of the arrays and the characteristics of the optical systems used for imaging. As shown in FIG. 1, the intersection of the bundle of rays falling on each element of one array with the bundle of rays falling on each element of the other array defines volumes where a given pair of bundles intersect within the space under surveillance. If there are N elements on each side of a square array, there are typically $N^3$ volumes defined by the intersection of the bundles of rays formed by each pair of elements, one from each array. The presence of an object within a given one of the $N^3$ volumes is known from simultaneous signals from the relevant pair of elements. In general the arrays are rectangular arrays, but the invention can be applied to linear arrays but will then give restricted directional information. If the linear arrays were located on two adjacent walls of a room with the axes of the arrays horizontal, the location of an object could be obtained in a plane parallel to the floor, but no information could be obtained about its height above the floor, other than that a part of the object is at the height of the linear array. This location information could be obtained from a single array mounted on the ceiling of the room, but only when the area of the coverage pattern is not large relative to the mounting height, and when such mounting is possible, e.g. when there is a ceiling.

Where the surveillance system is used to detect events such as the outbreak of fire or the entry of intruders, two arrays of pyroelectric detectors may be used, detecting the changes in the infra-red radiation falling on each array through imaging optics. As each element only responds to changes in temperature or emissivity in the direction defined by the optical system, the system does not detect the static characteristics of the scene. When an event associated with a change in temperature occurs, its location is known to be within the volume defined by the intersecting bundles of rays from the pair of elements stimulated. Checks may also be run on the characteristics of signals from the elements stimulated to determine the nature of the event, and whether an alarm condition is present. The location of the event being known, appropriate action may be directed to it, e.g. fire fighting or the arrest of an intruder.

Information about the location of objects or events can be determined using standard triangulation methods, although it should be noted that traditional triangulation defines a point in space, whereas the present invention can be used to identify volumes or groups of small volumes within a space, based on stimulation of pairs or sets of elements which uniquely identify the intersection volume or volumes in which the event occurs, within the volume under surveillance.

Alternatively the system may be set up by introducing objects into different parts of the space under surveillance and observing which pairs of elements are stimulated. Using this method, the location of objects can be identified, or the boundaries of regions defined. Where the system is to differentiate events occurring in certain regions of the space under surveillance from those in other regions, neural network learning techniques may be used to determine the pairs of elements associated with the designated region without forming an exhaustive survey of the entire space under surveillance.

There are certain circumstances under which three or more detector arrays may be used embodying the same invention, when outputs may be derived from any element pair from any pair of arrays, or from sets of elements, from more than two arrays. Such circumstances arise when the space surveyed is too large for surveillance by just a pair of arrays, or where the presence of obstacles prevents only two arrays providing positional information. Generally, additional arrays can be used to decrease the size of the volume elements, when higher resolution is required. For example, in a case where two arrays define a given set of intersection volumes, a third array can be added and arranged such that the intersection volumes which it defines with either of the first two arrays do not correspond with the original set of intersection volumes. Therefore, even though the achievable resolution may be the same for any given pair of arrays, if an event is detected in one of the intersection volumes defined by the first two arrays, the intersection volumes defined by the third array in combination with one of the other arrays may intersect the volume in which the event has been detected in such a way that it can be determined whether the event is located in a first or second part of the originally identified volume. This leads to an increase in the achievable resolution.

Where more than two arrays are used, events may be detected and located with respect to intersection volumes defined by pairs of elements from two different arrays, or alternatively intersection volumes may be defined with respect to a set of elements comprising respective elements from more than two different arrays. For example, where three arrays are used, information about the location of an event may be determined on the basis of a pair of elements stimulated in two of the three arrays, or the location may be identified on the basis of a set of three respective elements all being stimulated in the three arrays. The former arrangement may be used where the third array is provided as a back-up in case one of the arrays is obstructed, whereas the latter arrangement may be used where greater resolution is required.

The use of two or more arrays to give three-dimensional spatial information about target location, or to define a region within a volume, can be used in a wide variety of surveillance systems for security, fire, traffic and pedestrian control and the control of access in buildings.

Since the region under surveillance can be subdivided by using groups of intersection volumes, and areas can also be excluded from surveillance in this way, the invention can be used to reduce the amount of data which must be processed in order to provide the required surveillance functions in a given application. For example, while it may be desired to monitor substantially the whole region for the presence of flames, it may only be necessary to monitor a particular area for the unauthorised presence of people.

DRAWINGS

Figure 2:
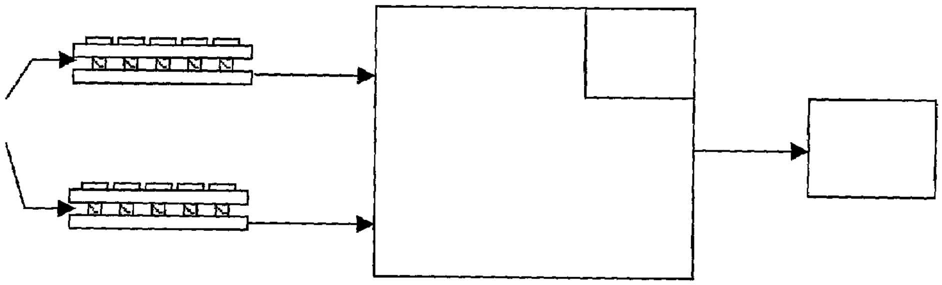

An embodiment of the invention will now be described by way of example with reference to the accompanying drawings in which:

FIG. 1 shows a cross-section of the detector arrays and optical system of a surveillance system according to the invention; and FIG. 2 shows schematically means for processing the signals from the arrays of FIG. 1.

As illustrated in FIG. 1, events can be detected within a volume lying in the common field of view of two pyroelectric arrays 1 and 2. Infrared radiation from this region is focused by lenses 3 and 4 onto the elements of each array. For clarity, the region between the arrays is shown as much smaller, relative to the region between the lenses and the arrays, than would usually obtain. A bundle of rays falling on element 5 within array 1 after being focused by lens 3 intersects with the bundle of rays from within the volume which falls on element 7 of array 2 after passing through lens 4. The region of intersection of these bundles defines a volume 8. Other rays from a region 9 also fall on element 7 of array 2, after passing through the lens 4. Other rays from region 9 fall also on element 6 of array 1 after passing through the lens 3. Thus element pairs (5,7) and (6,7) define volumes of intersection 8 and 9. The space within the common field of view of the lenses 3 and 4 is filled with similar volumes defined by other element pairs.

FIG. 2 shows a schematic diagram of the signal processing arrangement. The pyroelectric arrays 1 and 2 are mounted by means of conducting silver-loaded resin pillars 20 onto integrated circuits 21 and 22. Herein each detector element is connected to a pre-amplifier, and is then subject to a thresholding operation. Signals above a preset threshold may then be subject to further checks to avoid false alarms. For example, if the system is to be used to detect fires, the presence of irregular low frequency flicker in the signal is indicative of a flame. A pair of numbers that represent a pair of elements which both show signals above threshold is transmitted to a processor 23. In conjunction with this processor, or a part of it, is a look-up table 24 which stores the co-ordinates of the centroids of the intersecting volumes corresponding to each element number pair. If the coordinates lie in a pre-defined region within which events merit an alarm, the processor 23 outputs the co-ordinates together with an alarm signal to an external alarm 25. If however the co-ordinates lie within a predefined region of space in which events are to be disregarded, the processor does not output an alarm signal.

Instead of outputting the co-ordinates of the intersection volume, the processor may output any other information sufficient to identify the location of the event in a given application. For example, the processor may simply identify that the event is occurring in a particular intersection volume or group of intersection volumes, without outputting any more information about the location of the event. The information that an event, such as the presence of an intruder, is occurring within a predefined region of the space under surveillance may be sufficient for appropriate action to be taken, without necessarily outputting the precise location of the event. The same surveillance system may, however, output a much more precise indication of the location of the event if the event is the presence of a fire, for example, in order that the appropriate action can be taken with the necessary degree of precision in that case.

Other information may be determined by the processor and used to provide outputs such as the speed, direction of movement and an indication of the size of an event occurring within the space under surveillance. Using this information, the progress of events may be tracked through the space under surveillance.

The invention claimed is:

1. A surveillance system arranged to detect events in a scene comprising a predetermined volume in space, the surveillance system comprising:

at least two arrays of passive infrared detector elements, optical collection means associated with each array and arranged to view the volume from different positions so that radiation from the volume is focused onto the respective arrays, and means for processing signals from the elements of the arrays to determine information regarding the location within which an event occurs on the basis of signals from each element of a set of elements, the set comprising at least one element from each of at least two arrays, each location consisting of a volume of intersection between the fields of view of a respective set of elements comprising an element from each of at least two arrays, wherein the processing means stores information defining three-dimensional surfaces or volumes within the scene, the surfaces or volumes being described by adjacent individual intersection volumes within the scene and the information determined by the processing means includes information regarding the location within which the event occurs relative to said defined surfaces or volumes within the scene.

2. The surveillance system as claimed in claim 1, wherein the information determined by the processing means includes information regarding the distance of the event from each of the arrays.

3. The surveillance system as claimed in claim 1, wherein the processing means performs a thresholding operation on the signals from the detector elements, and selects only those elements whose signals are above a predetermined threshold to form the set of elements from which the signals are used to determine information regarding the location of the event.

4. The surveillance system as claimed in claim 1, wherein the processing means comprise:

means for storing information relating to individual locations within the volume, each location corresponding to an intersection between the fields of view of a respective set of elements comprising an element from each of at least two arrays, means for identifying an individual location within which the event occurs on the basis of the identity of the corresponding set of elements onto which radiation from the event is focused, and means for outputting the stored information relating to the identified location.

5. The surveillance system as claimed in claim 1, wherein the information determined by the processing means selectively includes or excludes events dependent on the location of the event relative to the surfaces or volumes within the scene.

6. The surveillance system as claimed in claim 1, wherein the arrays are substantially planar, two-dimensional arrays.

7. The surveillance system as claimed in claim 1, wherein the detector elements are pyroelectric detector elements.

8. The surveillance system as claimed in claim 1, wherein the optical collection means is a single lens.

* * * * *